July 20, 1937.  C. T. SCHMITT ET AL  2,087,305

BRAKE VALVE

Filed May 27, 1935    2 Sheets-Sheet 1

INVENTORS
C. T. Schmitt and
E. H. Brandt
By
ATTORNEY

July 20, 1937.  C. T. SCHMITT ET AL  2,087,305
BRAKE VALVE
Filed May 27, 1935   2 Sheets-Sheet 2

INVENTORS
Charles T. Schmitt and
E. H. Brandt
By
ATTORNEY

Patented July 20, 1937

2,087,305

UNITED STATES PATENT OFFICE 2,087,305

BRAKE VALVE

Charles T. Schmitt, Montclair, and Ernest H. Brandt, East Orange, N. J.

Application May 27, 1935, Serial No. 23,746

4 Claims. (Cl. 303—54)

This invention relates to new and useful improvements in automobile brake control, and more particularly to an air valve and associated mechanism for controlling the automatic application of brakes upon the release of the accelerator pedal.

The nature of the invention will more clearly appear from the following detailed description of certain preferred embodiments thereof and the appended claims.

In the drawings, Fig. 1 is a side elevation of the assembly of the device on an automobile;

Figure 1:
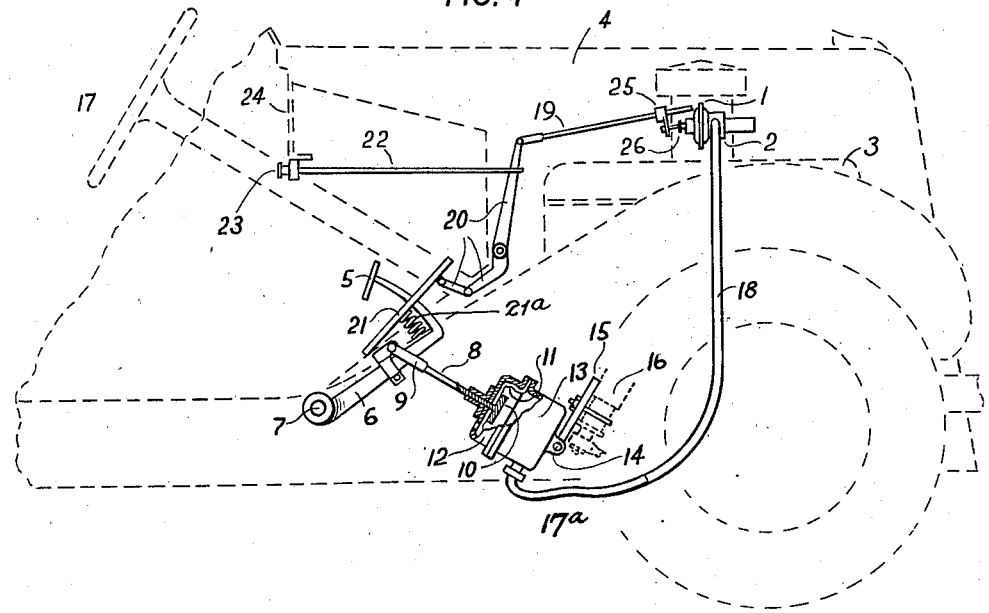

Referring now to Fig. 1, the valve I is suitably mounted adjacent the carburetor and manifold 2 of automobile engine 3. The wheel brakes of automobile 4 may be operated in any suitable manner by depressing a foot pedal extension 5 of a brake lever 6 fulcrumed on the chassis of the automobile at 7. For the sake of clarity and since the details have no bearing on the present invention, the brake-operating mechanism is not shown in the drawings. The lever 6 may be operated also by means of a rod 8 actuated by a suitable servo-motor and one end of which is fastened to the lever 6 at 9. The other end of rod 8 is fastened at 10 to a rubber diaphragm 11, the edge of which is clamped between two sections 12 and 13 of the servo-motor casing which is pivoted at 14 on bracket 15 clamped to a steering shaft 16 which is operated in the usual manner by the steering wheel 17. Owing to its pivotal mounting, the servo-motor may assume different positions as the brake lever descends and rises. The section 12 of the chamber is open to the atmosphere, but the section 13 is hermetically sealed by its walls and the rubber diaphragm 11. The chamber 13 is connected through a short piece of rubber tubing 17 to a copper pipe 18 which in turn is connected with the valve 1.

The carburetor of the automobile is operated in the usual manner by means of a rod 19 which, through a linkage 20, is connected with the accelerator pedal of the automobile, the normal stopping position of said linkage being determined by a horizontal rod 22 which may be longitudinally moved by means of a knob 23 on dashboard 24. The rod 19 carries near its end a finger 25, by means of which the head 26 of a hollow cylindrical plunger 27 forming part of the valve mechanism, may be operated.

A port 28 (Fig. 2) in valve casing 29 is connected with the engine manifold and the copper tube 18 is connected with port 30 in the casing. When, during the operation of the valve to be presently described, suction is applied from the manifold, air will be exhausted from the servomotor chamber 13 through the rubber tubing 17, pipe 18, port 30, the casing 29 of valve 1, and the port 28. This will move the diaphragm 11 down, whereby through the rod 8 the brake-actuating lever will be rotated in a clockwise direction to apply the wheel brakes. When atmospheric pressure is reestablished within the valve casing 29 and the chamber 13 connected therewith, the diaphragm 11 and brake lever 6 will be moved back towards the position shown in Fig. 1 by means of the usual spring mechanism (not shown).

The operation of the valve 1 is as follows:

The plunger 27 projects axially through casing 29 and is longitudinally slidable therein. The hollow plunger 27 is provided near its operating knob 26 with ports 31 which are always open to the atmosphere, and its other end carries a cup 32 within which is seated one end of a coiled spring 33. The other end of the coiled spring 33 presses against a cap 34 mounted on a recessed shoulder 35 of casing 29, whereby spring 33 will always tend to keep the plunger 27 in the position shown in Fig. 2. The bearing surfaces on which the plunger 27 may slide are constituted by the shoulder 35, a wall 36 within the casing 29, and a sleeve 37, 38. The sleeve 37, 38 is slidable with respect to the casing 29 and the plunger 27, but is normally held in the position shown in Fig. 2 by means of a coiled spring 39, one end of which rests in a recess of wall 36 and the other end of which engages a flange 40 on sleeve section 37. The sleeve section 38 fills the space between plunger 27 and a flange 41 provided in a portion 42 of the valve casing which is bolted as indicated at 43 to the casing portion 29. As will be observed from Figs. 2 and 3, the distance which sleeve 37, 38 may travel against the tension of spring 39 is less than the width of flange 41 on the casing section 42.

The chamber enclosed by the casing 29, 42, is divided into two compartments 44 and 45 by a flexible diaphragm 46. The edge of the diaphragm 46 is clamped between casing sections 42 and 29. The diaphragm 46 is of rubber and is centrally perforated, the edge of the central perforation being clamped between a shoulder 47 on sleeve section 38 and a ring 48 screwed on sleeve 38. The compartment 44 is open to the atmosphere as indicated at 49. The compartment 45 communicates through port 30 and the tubing 18, 17 with the servo-motor compartment 13. A third compartment within casing 29 is constituted by an annular passage 50 around plunger 27 and between wall 36 and the shoulder 35 of casing 29. The port 28 opens into the annular compartment 50.

The inside of the plunger 27 is divided into three sections or compartments by means of a hollow cylinder 51 having flanges 52 and 53 at its ends which engage the inside of plunger 27. The cylinder 51 may be integral with plunger 27 or may be a separate piece frictionally held in the plunger. The first one of these chambers is 54 which, as above stated, communicates with the atmosphere through ports 31. It is provided also with ports 55 which communicate with chamber 45 through holes 37' bored in sleeve 37, 38 between shoulders 40 and 47, said holes communicating with a channel 38' cut in the inner face of the sleeve. The second compartment is an annular chamber or passageway 56 between the outside surface of cylinder 51 and the inside surface of plunger 27. This compartment has a row of ports near each end 57 and 58, respectively. The third compartment is 59. It is open to the atmosphere through the end of plunger 27 and communicates with compartment 54 through the cylinder 51.

Figure 2:
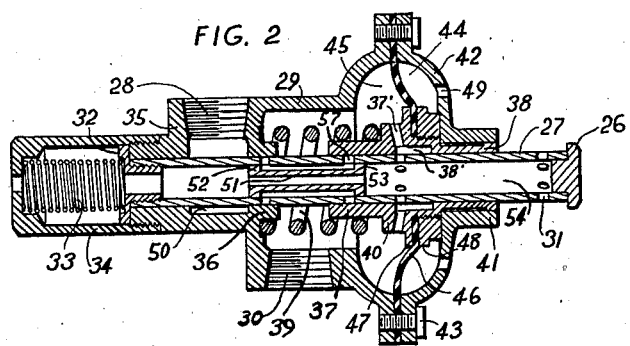
Figs. 2 and 3 show in longitudinal cross-section the improved valve in normal and fully actuated positions, respectively, the valve being reversed as compared with the showing in Fig. 1.

With the device in the position shown in Fig. 2, when the engine is working, suction will be applied from the manifold through port 28 and chamber 50 will be evacuated. All the other chambers and compartments of valve 1 and therefore the vacuum compartment 13 of the servo-motor, are under atmospheric pressure. When the driver removes his foot from the accelerator pedal 21 and permits it to rotate in a counter-clockwise direction under the action of the usual spring 21ᵃ actuating the linkage 20, the rod 19 will be longitudinally moved from left to right and will, by means of finger 25 engaging knob 26, press in the plunger 27 against the action of spring 33. The ports 55 will be moved out of groove 38' and within sleeve section 37, cutting off communication between chamber 45 and the atmosphere. The ports 58 will now communicate with the chamber 50, whereby air will be sucked out of passageway 56 immediately since, as above stated, the annular chamber 50 is constantly evacuated while the engine is operating. At this time the ports 57 are still closed by sleeve 37.

As the plunger 27 continues to move from left to right, the ports 58 remain in communication with the chamber 50 and the ports 57 pass by the edge of sleeve 37 and establish communication between chambers 45 and 56. Air will therefore be exhausted from the chamber 13 of the servo-motor through the tubing 17, 18, port 30, chamber 45, ports 57, passageway 56, ports 58, chamber 50 and port 28, to the manifold. The diaphragm 11 in the servo-motor will be moved down as above described and apply the brakes.

Figure 3:
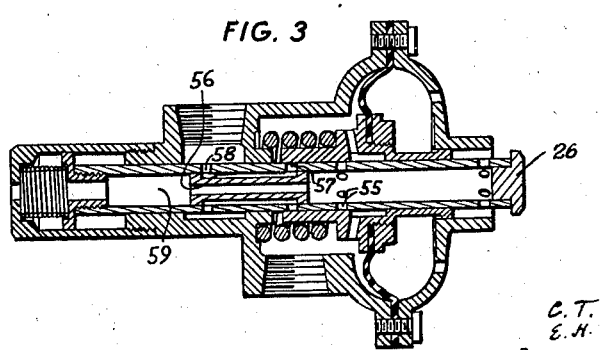

As the pressure in chamber 45 is reduced the diaphragm 46 of the valve is moved towards the position shown in Fig. 3, the sleeve 37, 38 sliding on the plunger 27 against the tension of spring 39. When the diaphragm assembly is moved into the position shown in Fig. 3, the sleeve 37 closes the ports 57 and still maintains ports 55 closed. This will cut off chamber 45, and therefore the servo-motor chamber 13, from chamber 56. The further exhaustion of air from chambers 45 and 13 is stopped but the brakes remain applied.

When the operator again depresses pedal 21 sufficiently to remove finger 25 from the knob 26, spring 33 will drive plunger 27 from right to left. First, ports 55 will clear the shoulder on sleeve 37 and connect chamber 45 through the apertures 37' with compartment 54 in the plunger 27. Air will rush into chamber 45 and through port 30 into vacuum chamber 13, permitting the restoration of brake lever 6 to normal under the control of the usual spring (not shown). Furthermore, as air pressure is increased within the chamber 45, the spring 39 will push the sleeve 37, 38 towards the position shown in Fig. 2. It will be noted that during the return of sleeve 37 to normal it maintained the ports 57 of chamber 56 closed, whereby this chamber will remain evacuated, although in the normal position of the valve its ports 58 are not in communication with the chamber 50, but are closed by the wall 36.

Owing to the fact that chambers 50 and 56 are, during the operation of the engine, constantly under low pressure, the instant when upon the actuation of plunger 27 the ports 57 clear sleeve 37, the air in chambers 45 and 13 will rush into the low pressure chambers 56 and 50, the communication between chamber 45 and the atmosphere having already been cut off at ports 55. These chambers are so proportioned that this will immediately take the slack out of the braking system and the application of the brakes will begin almost instantaneously upon the release of pressure on the accelerator pedal 21. The application of the brakes will then be gradually increased as air is sucked out of chambers 45 and 13. This arrangement guards against slamming on of the brakes and insures that the application be firm and at the proper rate. Preferably, the servo-motor and the valve are arranged to apply approximately 95% of the total braking capacity. The additional 5% may be applied, if necessary, by the driver bearing down on the brake pedal 5. Since in the actuated position of the plunger the ports 55 are just past the left edge of sleeve 37, the instant pedal 21 is depressed these ports will clear the sleeve 37 and permit air to rush into chambers 45 and 13, relieving pressure on the brakes.

As indicated in the drawings, the ports 55, 57 and 58 are within radial grooves cut in the outside surface of plunger 27, whereby all the ports of a row communicate with one another. This will guard against failure of operation should one of the ports become stopped up and also against the binding of plunger 27 on its bearing surfaces, since the suction applied to the plunger surfaces adjacent the ports is uniformly distributed throughout the circumference of the plunger. The free sliding of plunger 27 is further insured by the constant maintenance of atmospheric pressure in compartments 54 and 59 of the plunger and in the enclosure 34 around the end of plunger 27.

Figure 4:
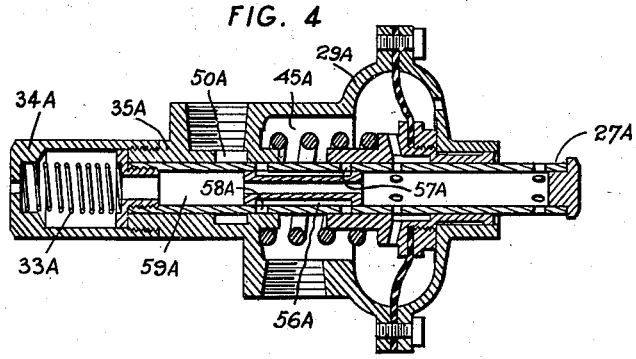
Figs. 4 and 5 are similar views of a modified form of the valve.
Figure 5:
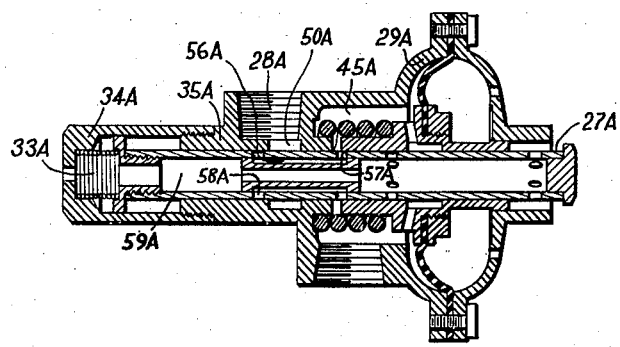

The operation of the device illustrated in Figs. 4 and 5 is identical with that of the device shown in Figs. 2 and 3. There is one exception. When the previously described valve is in the position shown in Fig. 3, the chamber 56 remains in communication with chamber 50 and therefore with the manifold of the engine. Should the driver stall his engine, the suction from the manifold would cease and atmospheric pressure would be established in chambers 50 and 56. Since the movable parts of the device do not form a truly hermetic seal, sufficient air would seep into chamber 45 to permit spring 39 to restore the diaphragm assembly to normal, and, of course, atmospheric pressure will be reestablished in chambers 45 and 13, whereby the brakes will go off. To guard against this, in the arrangement shown in Figs. 4 and 5, chamber 50A is made somewhat smaller so that in the actuated position of plunger 27A (Fig. 5), the ports 58A clear this chamber and are closed by shoulder 35A of casing 29A. Also, even in the fully actuated position of the plunger, ports 57A remain in communication with chamber 45A. Should, therefore, the driver stall his motor and should air rush in through port 28A into chamber 50A, this air cannot escape into chamber 56A and thence into chambers 45A and 13, whereby the brakes will remain applied, whether or not the engine is running. The release of the brakes can be effected only by relieving foot pressure on pedal 21 and permitting plunger 27A to return to normal under the action of spring 33A.

In this structure also the end compartment 59A in the plunger 27A, and the chamber within cap 34A, is maintained under atmospheric pressure throughout the operation, whereby no low pressure areas can be set up around most of the surface area of the plunger so as to oppose the action of the spring 33A to return the plunger to normal when desired. The restoring spring may, therefore, be light, insuring ease of operation of the plunger. Besides, in this as well as the embodiment disclosed in Figs. 2 and 3, air will penetrate between the outside surface of the plunger and the bearing surfaces constituted by sleeves 38 and 35, whereby free sliding of the plunger is insured without the use of any additional lubricant. If the ends of the plunger were not thus air-lubricated, the metallic surfaces would bind, since any lubricant conducted thereto would be blown out during the operation of the valve.

What we claim is:

1. In a valve for controlling the application of brakes in an automobile, a casing enclosing three chambers, a flexible diaphragm dividing one of said chambers into two compartments, the first one of said compartments and the third chamber being permanently open to the atmosphere, a cylindrical plunger projecting throughout said casing, partitions in said plunger dividing it into three sections, the first section having ports communicating with the atmosphere and the third section, and ports normally communicating with the second compartment of the first chamber, the second section having two sets of ports, one adapted to communicate with the second compartment of the first chamber and the other with the second chamber, a spring-pressed sleeve within said first chamber surrounding said plunger and projecting through said diaphragm, said sleeve having openings communicating with the second set of ports in the first section of the plunger and with the second compartment in the first chamber, a connection from the manifold of the automobile engine to the second chamber, and a servo-motor connected with the second compartment of the first chamber.

2. In a valve for controlling the application of brakes in an automobile, a casing enclosing three chambers, a flexible diaphragm dividing one of said chambers into two compartments, the first one of said compartments and the third chamber being permanently open to the atmosphere, a cylindrical plunger projecting throughout said casing, a coiled spring between the end of said plunger and the wall of said third chamber, partitions in said plunger dividing it into three sections, the first section having ports communicating with the atmosphere and the third section, and ports normally communicating with the second compartment of the first chamber, whereby atmospheric pressure will be maintained inside and outside of the first and third sections of the plunger, the second section having two sets of ports, one adapted to communicate with the second compartment of the first chamber and the other with the second chamber, a spring-pressed sleeve within said first chamber surrounding said plunger and projecting through said diaphragm, said sleeve having openings normally communicating with the second set of ports in the first section of the plunger and with the second compartment in the first chamber, a connection from the manifold of the automobile engine to the second chamber, a servo-motor connected with the second compartment of the first chamber, and means for moving said plunger with respect to said casing and sleeve.

3. In a valve for controlling the application of brakes in an automobile, a casing enclosing two chambers, a connection between the engine manifold and the first chamber and a connection between the second chamber and the brakes, a hollow plunger traversing said casing and open to the atmosphere through a substantial portion of its length, means for moving the plunger in one direction and a spring tending to move it in the opposite direction, a closed passageway through the central portion of the plunger and having two ports, said ports being so spaced that during the moving of the plunger in one direction first the first port communicates with the first chamber and then the second port with the second chamber, means responsive to air pressure in the second chamber for closing said second port, and a flexible wall for said second chamber attached to the last mentioned means and having one side exposed to atmospheric pressure.

4. In a valve for controlling the application of brakes in an automobile, a casing enclosing two chambers, a connection between the engine manifold and the first chamber and a connection between the second chamber and the brakes, a hollow plunger traversing said casing, means for moving the plunger in one direction and a spring tending to move it in the opposite direction, a closed passageway through the central portion of the plunger and having two ports, the end portions of the plunger being open to the atmosphere, said ports being so spaced that during the moving of the plunger in one direction first the first port communicates with the first chamber and then the second port with the second chamber, a spring-pressed sleeve in the second chamber surrounding said plunger, and a flexible wall for said second chamber fastened to said sleeve.

CHARLES T. SCHMITT.
ERNEST H. BRANDT.